(12) United States Patent
Wang et al.

(10) Patent No.: US 6,816,513 B2
(45) Date of Patent: Nov. 9, 2004

(54) HIGH POWER HIGH EFFICIENCY CLADDING PUMPING FIBER LASER

(75) Inventors: Zhijiang Wang, Diamond bar, CA (US); Ying Wang, Diamond bar, CA (US); Alice Gheen, Irvine, CA (US)

(73) Assignee: Apollo Instruments, Inc., Irvine, CA (US)

( * ) Notice: Subject to any disclaimer, the term of this patent is extended or adjusted under 35 U.S.C. 154(b) by 38 days.

(21) Appl. No.: 09/824,188

(22) Filed: Apr. 2, 2001

(65) Prior Publication Data

US 2002/0141718 A1 Oct. 3, 2002

(51) Int. Cl.$^7$ ............................. H01S 3/067; G02B 6/22
(52) U.S. Cl. ........................... 372/6; 385/123; 385/126
(58) Field of Search ............................. 372/6, 700, 72, 372/64, 66, 75; 385/123–128, 146

(56) References Cited

U.S. PATENT DOCUMENTS

| | | | |
|---|---|---|---|
| 5,373,576 A | * 12/1994 | Minns et al. | 385/125 |
| 5,500,764 A | 3/1996 | Armitage et al. | |
| 5,530,709 A | * 6/1996 | Waarts et al. | 372/6 |
| 5,533,163 A | * 7/1996 | Muendel | 385/126 |
| 5,657,153 A | 8/1997 | Endriz et al. | |
| 5,864,645 A | * 1/1999 | Zellmer et al. | 385/126 |
| 5,949,941 A | * 9/1999 | DiGiovanni | 385/127 |
| 6,101,199 A | * 8/2000 | Wang et al. | 372/6 |
| 6,157,763 A | * 12/2000 | Grubb et al. | 385/126 |
| 6,421,178 B1 | 7/2002 | Lissotschenko et al. | |
| 6,477,307 B1 | * 11/2002 | Tankala et al. | 385/127 |
| 6,483,973 B1 | * 11/2002 | Mazzarese et al. | 385/123 |
| 6,516,124 B2 | * 2/2003 | Po | 385/126 |
| 2002/0172486 A1 | * 11/2002 | Fermann | 385/128 |

* cited by examiner

*Primary Examiner*—Don Wong
*Assistant Examiner*—James Menefee
(74) *Attorney, Agent, or Firm*—William Michael Hynes; Townsend and Townsend and Crew LLP

(57) ABSTRACT

In the present invention, methods and apparatus for making efficient cladding pumping fiber lasers is disclosed. In particular, new fiber cladding geometry and method of construct fiber lasers and amplifiers using the laser fibers of the current invention are disclosed. The aspects of the present invention will facilitate the realization of high-efficiency and high-power fiber lasers and amplifiers. In the present invention, cladding boundary geometry structures that can prevent the formation of local modes are disclosed. Thus the pumping laser coupling method can be used for the construction of high-efficiency fiber lasers. Thus, the fiber lasers of this invention may comprise a laser fiber with its core doped with active species, having an asymmetric and symmetry-broken inner cladding or a multiple-imaging inner cladding surrounding said core, a laser diode array, reflector means at both ends of said laser fiber, and coupling optical system disposed between said laser diode array and the aperture of said laser fiber for coupling the pump beam from said laser diode array through a reflector into said inner cladding.

2 Claims, 9 Drawing Sheets

HIGH POWER HIGH EFFICIENCY CLADDING PUMPING FIBER LASER

BACKGROUND OF THE INVENTION

1. Technical Field

The present invention relates to cladding pumping fiber lasers, and in particular relates to the fiber cladding geometry structure and method for construction of high-efficiency fiber lasers for various applications including optical amplifiers.

2. Background Art

The development of diode pumped fiber lasers has been rather successful recently. The scaling of various physical effects has greatly benefited this development. Diode lasers can provide concentrated pumping energy and thus enhance the efficiency of fiber lasers. The long thin geometry of fiber also makes heat removal much easier than in bulk solid state lasers. In end-pumped fiber lasers, a large outer cladding is used in cladding pumping. Pump light, often piped through fibers from pump lasers, enters the outer core, where it is confined so that it passes through the inner core, exciting the laser species. Stimulated emission from the laser species remains in the inner core. By converting the low brightness beam from the pump diode bar into a tighter beam, pumping a fiber laser can multiply brightness by a factor of more than 1000. By using such configuration, Polaroid, for example, reported a diode cladding pumping fiber laser reaching 35 W (M. Muedel et al CLEO '97, Postdeadline Paper CPD30, Baltimore, Md., 1997).

Currently, a typical fiber laser device includes a tens-of-meters double clad silica fiber with a small diameter and small NA core doped with active species, centered within a much larger inner cladding, surrounded by a soft low index fluoropolymer providing an acceptance NA of 0.45 for pump radiation. Pumping laser beams from laser diodes are coupled into the fiber inner cladding through the dichroic end mirror. (HR laser, HT pump). Among other things, the cladding pumping geometry and the coupling efficiency of pumping laser diode array are the main factors under intense research. Proper geometry is essential for increasing the efficiency of cladding pumping. Good method of coupling will allow more power to be injected into the fiber laser, which in turn also increase the efficiency of a fiber laser.

There are many patents dealing with cladding pumping for various applications including optical amplifiers. U.S. Pat. Nos. 5,533,163, 4,829,529, 4,815,079, 6,157,763 disclose various cladding cross-sectional geometric shapes such as circle, rectangle, convex polygon (triangle, rhombus, hexagon), or modified circles. These cladding boundary (CB) shapes, however, have certain obvious disadvantages. The main disadvantage is the presence of local modes. During our research, we discovered that the presence of local modes is one of the main factors decreasing the efficiency of a double cladding fiber. Essentially, the pumping beam localized in such modes in the inner cladding can not enter the core or can not enter the core efficiently.

When skew ray is reflected on an arbitrary cylindrical surface, the projections of incident ray and reflected ray on the principal cross section are like the light ray reflected in this plane. Therefore, we can use the behavior of light beams in the principal cross section of cylindrical surface to determine local modes of fiber cladding.

The boundary shapes of efficient fiber cladding geometry include circular, rectangle, right triangle, isosceles triangle, and rhombus. As a comparison with the current invention, the local modes in fiber cladding with different boundary shapes are summarized as follows.

FIG. 1 shows a schematic illustration of a light beam path in prior art circular fiber cladding with a circular cladding boundary CB. Because the sag of ray keeps constant in multiple reflection, the light beams $LB_0$ initial at the outer region can not reach central region through multiple reflection. Therefore, the center position is not a good location for core A, and the core must be close to the boundary as position B although center position is usually more preferred due to the structures of fiber connections. FIG. 2 is a schematic illustration showing the local modes in prior art rectangular fiber cladding with a boundary CB. There are two types of local modes in the rectangular cladding. One is the light beam perpendicular to the boundary ($LB_1$, and $LB_2$), the other one is the light beam parallel to the line joining two corners ($LB_3$). These light beams form different close cyclic loops in the rectangular boundary. Besides these two fiber cladding geometry shapes, there are also right triangle, isosceles triangle and rhombus. For right triangle case, the light beams perpendicular to the hypotenuse form different close loops in the right triangle boundary as shown in FIG. 3 ($LB_4$ and $LB_5$). In isosceles triangle fiber cladding, there are two types of local modes as shown in FIG. 4. One is the light beam perpendicular to the leg ($LB_6$), the other type is the light beam parallel to the base ($LB_7$). Rhombus cladding behaves like two isosceles triangles. The local modes in rhombus cladding are the same as in isosceles triangle as shown in FIG. 5.

To increase the efficiency of a double cladding fiber, sometimes bending in the fiber structure is suggested to provide perturbation in the modes propagating in the multi-mode cladding. However, the effect of bending on perturbation is not clear, and can not be accurately predicted. Other methods include introduce mirror surfaces into the otherwise circular inner cladding, such those shown in FIGS. 6, 7, and 8. Although some of the local modes can be destroyed with these geometry shapes as the inner cladding, the integral reflection loops still exist due to the presence of geometrical symmetry as shown by the localized beams LB8, LB9 and LB10, respectively.

If a fiber cladding has some local modes and the core is not in the region of the local modes, the pumping light beam of local modes can not reach the core and the pumping efficiency will decline. But the presence of local mode was not noticed in the past and therefore the improved cladding geometry could not destroy all the local modes due to the presence of symmetry. The efficiency of fiber was not maximized. It will be much more favorable to find new cladding geometry structures so that local modes are destabilized or destroyed so that the pumping beam can easily enter the core. In this way, the efficiency can be increased and the length of fiber lasers can be reduced.

Currently, the leading company in fiber laser research and manufacturing is Polaroid. One fiber laser of Polaroid was reported to have high efficiency (about 65%), but this efficiency is the ratio of pumping laser power entered the optical fiber and the output power of the fiber laser. Therefore, the efficiency of coupling or power injection is not considered. In this Polaroid fiber laser, three fiber-coupled SDL P6 diodes are spatially combined and de-magnified into a rectangular cladding. The slop efficiency of the diode lasers is only 0.5 W/A, while the efficiency of a non-fiber coupled diode laser is much higher, 1.25 W/A. Therefore the total electric efficiency of this Polaroid fiber laser is not high. In addition, due to the limitation of the cladding geometry, tens of meters of fiber must be used in this state-of-the-art system. Furthermore, since it is difficult to couple more beams into an optical fiber with the coupling method used in the Polaroid systems, it is difficult to develop a fiber laser with even higher power, such as 1000 W CW. It is therefore necessary to find new methods to couple high power into optical fibers and improve the pumping efficiency.

SUMMARY OF THE INVENTION

Accordingly, it is the principal object of the present invention to provide a high-efficiency cladding pumping fiber laser for various applications including optical amplifiers by using fibers with efficient cladding geometry.

It is also an object of the present invention to provide a method and apparatus with which an efficient double cladding laser fiber can be made that has a cladding geometry that can avoid or minimize local modes.

It is another object of the present invention to provide methods of making double cladding fibers with inner cladding having shapes that destabilize and destroy local modes of light beams within inner cladding.

It is another object of the present invention to provide novel cladding geometry so that the length of laser fibers can be reduced.

To achieve the foregoing and other objects, and in accordance with the purposes of the present invention, as embodied and broadly described herein, a preferred article for gain applications may comprise a diode laser pumping source comprising at least one laser diode array, a double cladding laser fiber having an inner cladding and an outer cladding with the core of the fiber doped with active species, and a coupling optical system that is disposed between said diode laser pumping source and the aperture of said fiber, and focuses the beam from the diode laser pumping source into the inner cladding of the double cladding laser fiber, wherein the cross-sectional shape of said inner cladding is an asymmetric and symmetry-broken polygon that destabilizes local modes of light beams within said inner cladding. One of more of the boundaries of the polygon shaped cross-section of the inner cladding can also be arc. In the fibers of this invention, the cross-sectional shape of said inner cladding can also be a multiple-imaging cladding or a rectangular-like multiple-imaging cladding. The article or apparatus for gain applications summarized above can be a fiber laser by further including reflector means at each end of the fiber, or it can also be an optical amplifier by further including a coupler means so that input signal can be coupled into the double cladding laser fiber and amplified.

Additional objects, new features and advantages of the present invention will be set forth in part in the following description. Further scope of applicability of the present invention will become apparent from the detail description of the invention provided hereinafter. It should be understood, however, that the detailed description of the invention and the specific examples presented, while indicating preferred embodiment of present invention, are provided for illustration purposes only, because various changes and modifications within the scope and spirit of the present invention will become apparent to those of ordinary skill in the art from the detail description of the invention that follows.

BRIEF DESCRIPTION OF THE DRAWINGS

The accompanying drawings serve to explain the principles of the invention, in which.

DETAILED DESCRIPTION OF THE INVENTION

In the present invention, the methods and apparatus for making efficient cladding pumping fiber lasers are disclosed. In particular, double cladding fiber lasers or amplifiers comprising new fiber cladding geometry structures are disclosed. The aspects of the present invention will facilitate the realization of high-efficiency fiber lasers and optical amplifiers. In the present invention, cladding boundary geometry structures that can prevent the formation of local modes are disclosed. The new cladding shapes can be made into large dimension if desired. Efficient fiber lasers and optical amplifiers can then be constructed using these double cladding fibers. Thus, the fiber lasers of this invention may comprise a fiber laser core doped with active species, a symmetry-broken inner cladding or a multiple-imaging inner cladding surrounding said core, an outer cladding surrounding the inner cladding, reflector means at each end of the fiber, an optical pumping source generating optical pumping beam that is coupled into the inner cladding of said fiber by a coupling optical system.

1. Fiber Cladding Geometry for Fiber Lasers and Optical Amplifiers

From the previous discussion of prior art, it can be seen that the boundary symmetry benefits the generation of local modes. Therefore, a favorite boundary for fiber cladding should be a symmetry-broken boundary, and we discovered that it is easy to break the symmetry of boundary with appropriate boundary perturbation.

Some embodiments of possible cladding geometry structures are discussed below. With this principle, it is apparent to the skilled in the art that any inner cladding geometry structure with a symmetry-broken shape can be used to reduce or eliminate the formation of local modes, and this in turn will increase the efficiency of cladding fiber lasers.

(a) Symmetry-broken Polygon Cladding With Straight Boundaries

The structure of double cladding fiber is well known in the art. It comprises at least one single mode core doped with active species based on application, an inner cladding surrounding the core and an outer cladding layer surrounding the inner cladding. The pump radiation is transferred from the modes in the inner cladding to the absorptive, single mode core as they propagate along the length of the fiber.

Figure 1:
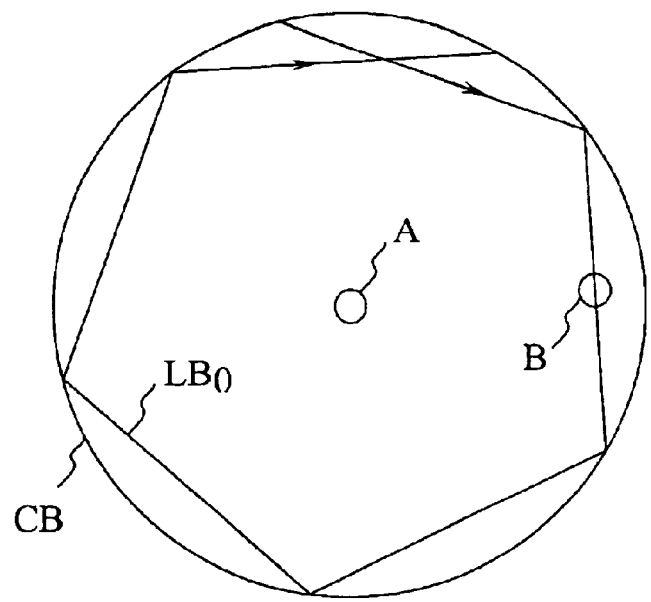
FIG. 1 shows a schematic illustration of light beam path in prior art circular fiber cladding with a circular cladding boundary.
Figure 2:
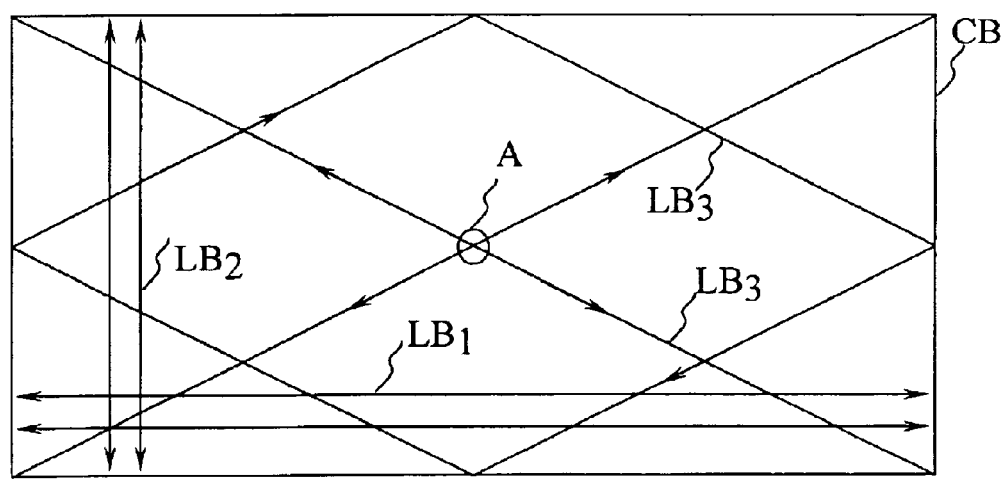
FIG. 2 is a schematic illustration showing the local modes in prior art rectangular fiber cladding.
Figure 3:
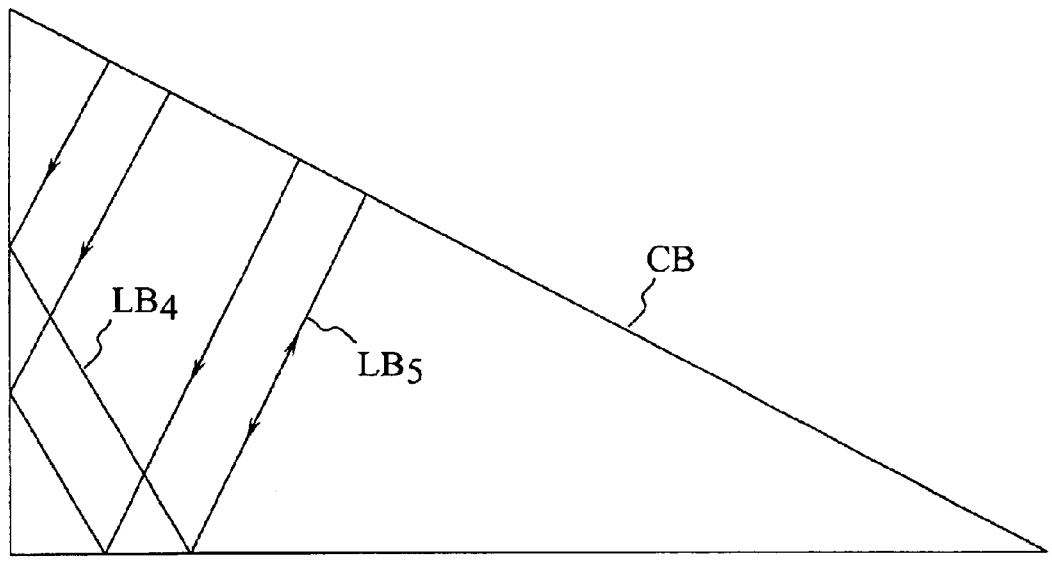
FIG. 3 is a schematic drawing showing the local modes formed in cladding with right triangle boundary.
Figure 4:
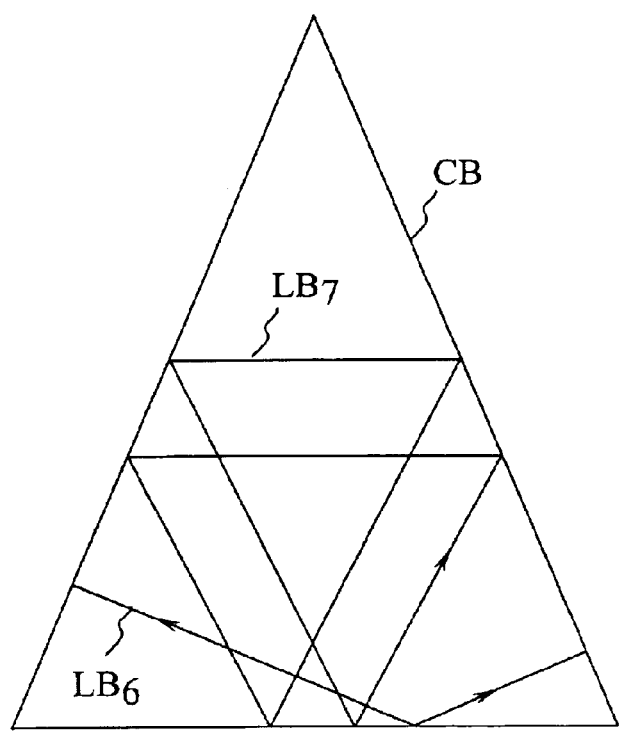
FIG. 4 is a schematic drawing showing the local modes formed in cladding with isosceles triangle boundary.
Figure 5:
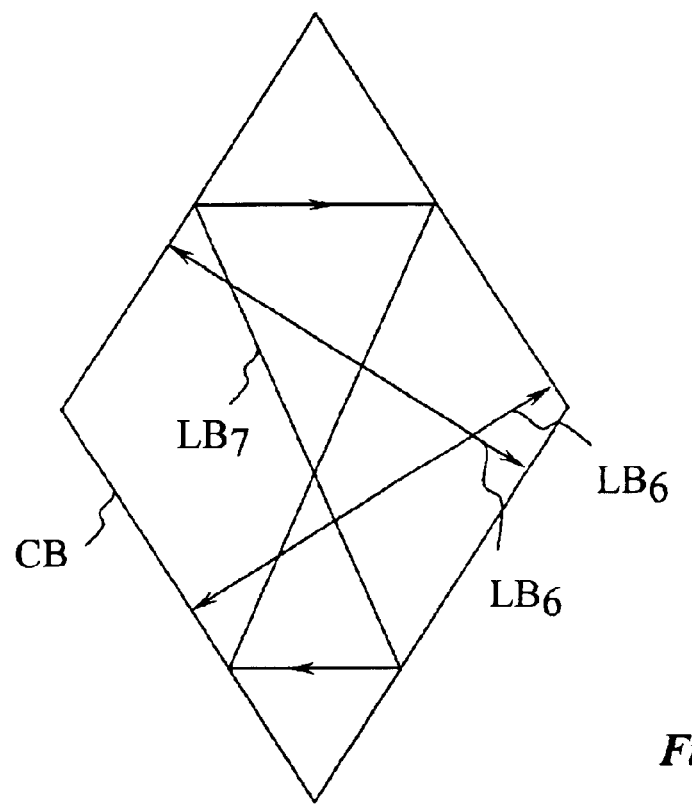
FIG. 5 is a schematic drawing showing the local modes formed in cladding with rhombus boundary.
Figure 6:
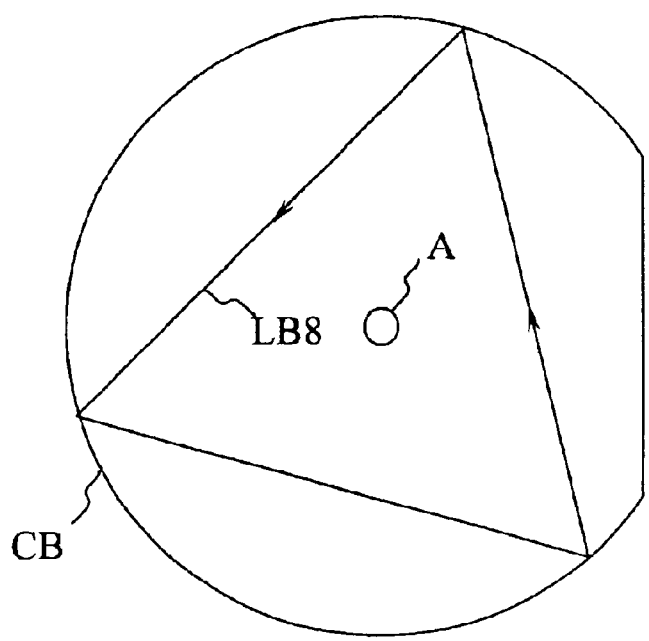
FIG. 6 is a schematic drawing showing the cross-section of a modified circular cladding wherein a plane mirror boundary is not enough to destabilize some local modes.
Figure 7:
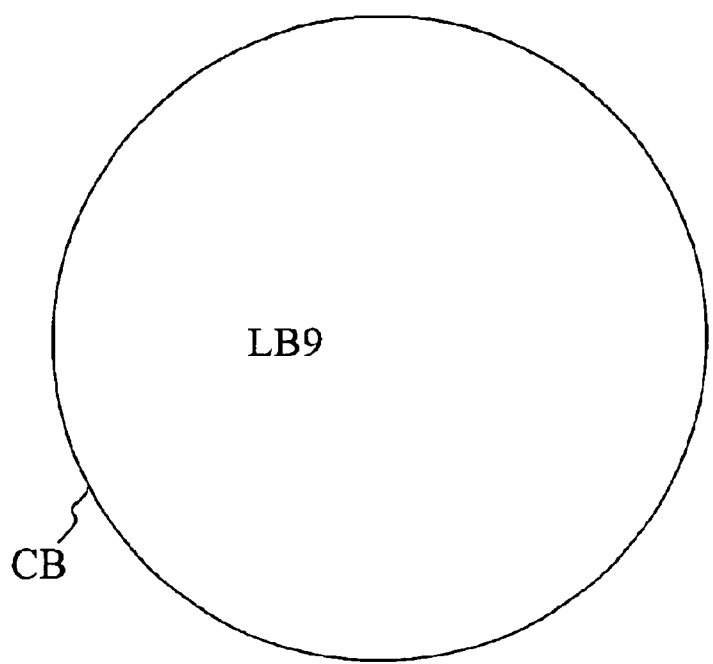
FIG. 7 is a schematic drawing showing the cross-section of a circular cladding wherein a convex mirror boundary is not enough to destabilize some local modes.
Figure 8:
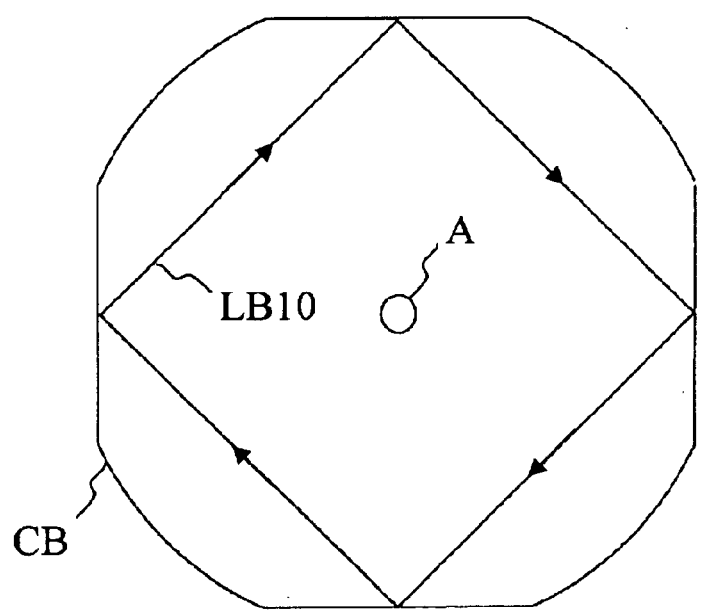
FIG. 8 is a schematic drawing showing a cross-section of a modified circular cladding from prior art with a plane mirror boundaries, wherein some local modes can not be destabilized.
Figure 9:
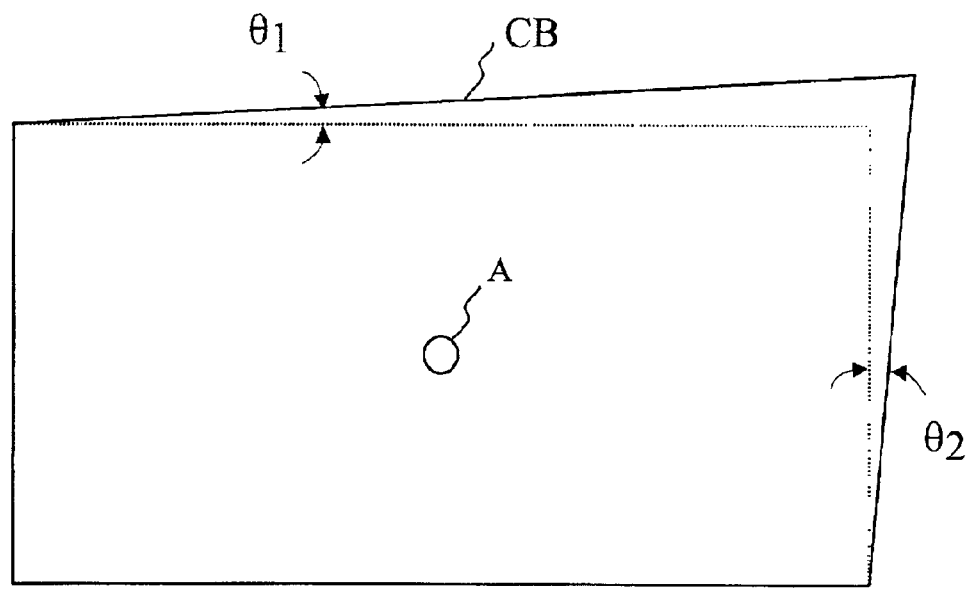
FIG. 9 is a schematic drawing showing a symmetry-broken rectangle-like boundary, wherein the presence of small angles makes the surface no longer parallel.
Figure 10:
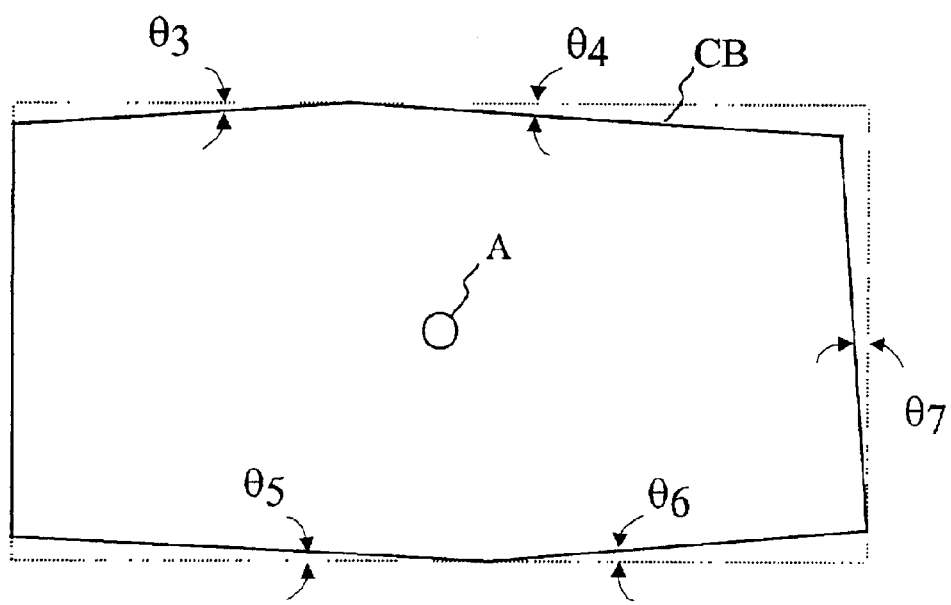
FIG. 10 is a schematic drawing showing a different symmetry-broken rectangle-like boundary, wherein the presence of small angles makes the surface no longer parallel.

FIG. 9 shows an embodiment of asymmetric rectangle-like inner cladding boundary of a double cladding fiber. FIG. 10 is another embodiment of such inner cladding boundary. The core A is doped or co-doped with active species such as erbium, neodymium, or ytterbium. In these two cross-sectional views, the presence of small angles ($\theta_1$, $\theta_2$, $\theta_3$, $\theta_4$, $\theta_5$, $\theta_6$, $\theta_7$) between the boundaries and the sides of a true rectangle (shown in dot line) makes the surfaces no longer parallel to each other. In these configurations, the core A also can be located near the center. Of course it can also be located off the center of the double cladding fiber.

With the symmetry-broken cladding geometry in these embodiments, light beam can not be localized or stabilized, and thus the local modes are minimized or destroyed. The light beam entering the inner cladding will enter the core after multiple reflections. It is obvious a rectangular shape or a square shape or any other polygon shape can be modified in numbers of ways to achieve the purpose of breaking symmetry. For the cladding shape selection, it is important to design the angles so that the numbers of beam reflection can be minimized so that the beam in the inner cladding can enter the core sooner. It is unnecessary to consider uniform radiation field in the inner cladding for this purpose. Since each time the beams pass through the fiber core only a small fraction is absorbed, the uniformity of beams in the fiber core should never be a problem.

With the same principle, other symmetric polygons such as a pentagon, a hexagon or an octagon can be modified slightly by introducing small angles to destroy the symmetry and achieve the same results of minimizing or destroying local modes. The double cladding laser fibers according to the invention achieves a higher optical efficiency than conventional fiber lasers and requires a shorter fiber length for complete absorption of pumping light. This type of double cladding is easy to fabricate by introducing the angles in the polygon preform before the outer cladding is added. In practice, it is convenient to use cylindrical preform as the starting material for making inner cladding with asymmetric and symmetry-broken shapes. The grinding of the cylindrical surface of the preform can be carried out by means of conventional surface grinding machines that are used in the optics industry.

(b) Symmetry-broken Polygon Cladding With Arc Boundaries

Figure 11A:
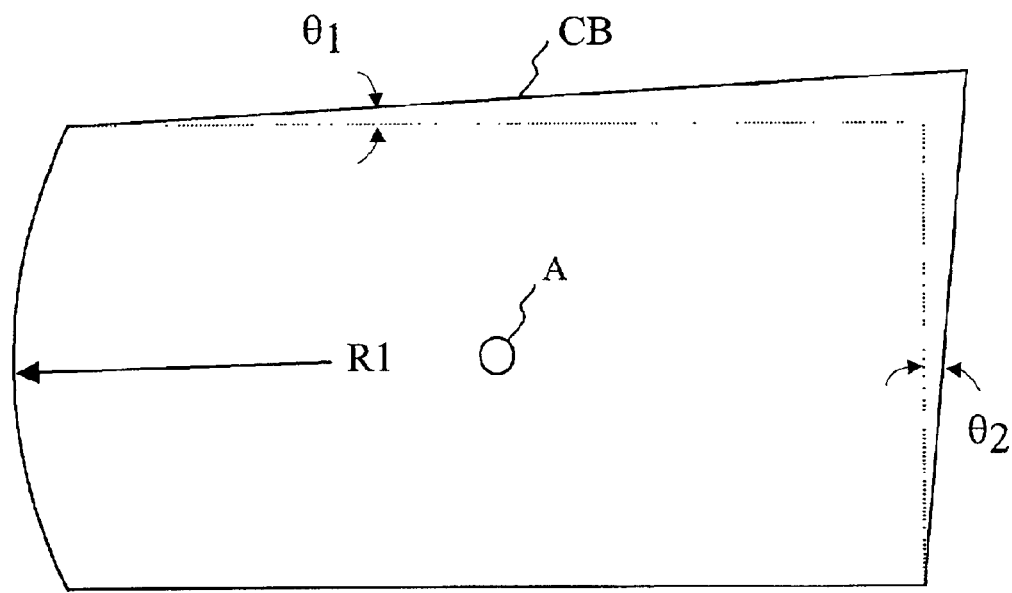
FIG. 11a is a schematic drawing showing a symmetry-broken rectangle-like boundary, wherein an arc is introduced as one of the boundaries.
Figure 11B:
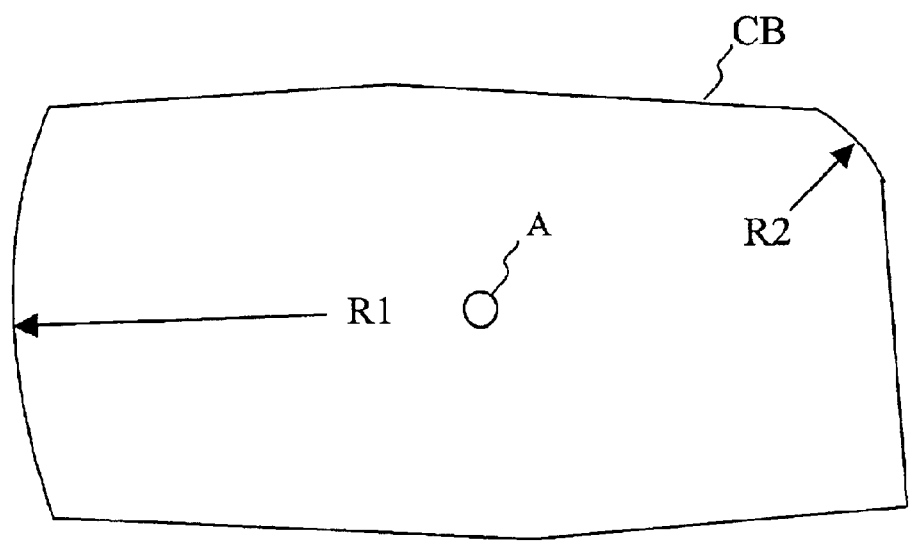
FIG. 11b is a schematic drawing showing a symmetry-broken rectangle-like boundary, wherein two arcs are introduced as the boundaries.

FIG. 11a shows another embodiment of inner cladding geometry. Again, by introducing small angles to modify a rectangular (or square) inner cladding, a symmetry-broken inner cladding is formed. In this embodiment, however, an arc with a radius R1 is also introduced. As for the symmetry-broken polygon cladding with straight boundaries, any polygon shape can be modified this way to be asymmetric with the function of destabilizing local modes. Arc with any radius can be used but it is preferred that the core is located at the center of the radius. FIG. 11b illustrates a similar embodiment with two arcs in the inner cladding boundary. The same as the embodiment shown in FIG. 11a, the radii (R1 and R2) of the arcs are arbitrary, and are not necessary the same for each arc. In these two embodiments, the arcs have a concave shape with the radial center being inside the boundary of the cladding. Convex mirror boundary can also be introduced. It is obvious that any polygon other than a rectangular geometry can be modified into such a shape to provide an efficient inner cladding. It is also obvious to the skilled in the art that more than two arcs can be introduced as long as the symmetry-broken property is kept so that local modes can be destabilized and destroyed. In practice, a cylinder-like preform can be used as the raw material to make such inner cladding.

(c) Multiple-imaging Cladding

Because the cross-section of core is much smaller than cladding, pumping beams in cladding must reflect multiple times before passing through the core. Multiple-imaging claddings can often reduce the number of reflection. It will then be possible to provide numbers of reflection substantially equal to the ratio between cladding dimension and core dimension.

Figure 12:
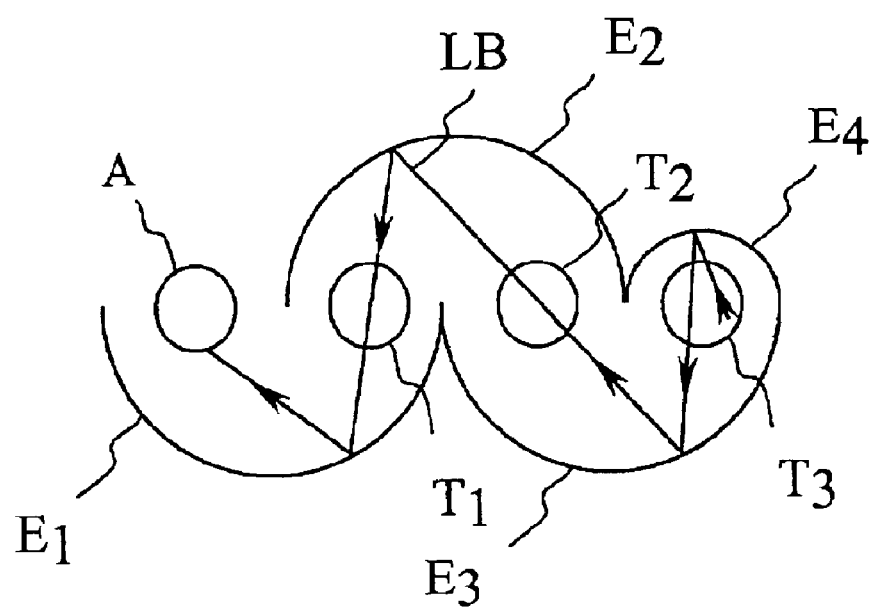
FIG. 12 is a schematic drawing showing a multiple-imaging cladding for cladding pumping.
Figure 13:
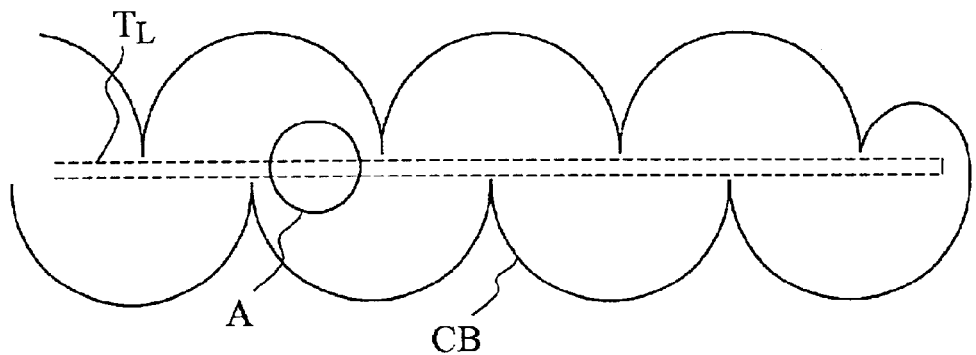
FIG. 13 is a schematic illustration showing a long light source $T_L$ passing through the core by multiple-imaging cladding.

FIG. 12 and 13 show multiple-imaging cladding for claddings pumping. It is the configurations that pile up multiple light source images at the core. In FIG. 12, light source T1 forms an image at the core A by mirror E1, light source T2 forms an image at T1 by mirror E2, light source T3 form an image at T2 by mirror E3, and so on. The other half of light beam LB from T3 will be reflected back by mirror E4, and will enter the core through multiple reflections by mirrors E3, E2, and E1. The mirror surfaces of E1, E2 and E3 may be circular cylinders or elliptical cylinders. It can be seen that with the increase of light sources, the number of reflection will be increased in proportion with the increase of the cladding dimension. This method will allow the arbitrary increase of cladding dimension. Essentially, all of the light beams in the cladding will enter the small core through multiple imaging.

FIG. 13 shows a case of a long light source $T_L$ passing through the core by multiple-imaging cladding. Note that the light source and the cladding mirror are extended to the other direction of the core, so the core is at the center of the cladding in this example. But the core does not have to be at the center to achieve the same results.

(d) Rectangular-like Multiple-imaging Cladding

Rectangular-like cladding described earlier can be modified to be a multiple-imaging cladding—rectangular-like multiple-imaging cladding.

Figure 14:
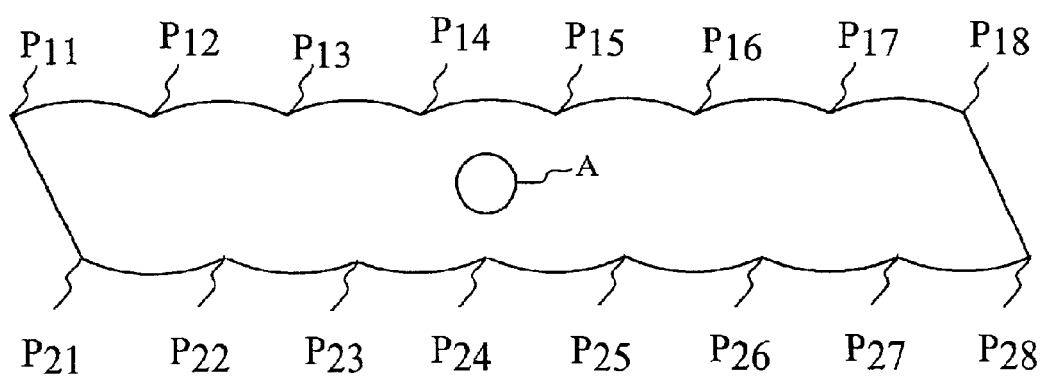
FIG. 14 is a schematic illustration showing the cross-section of a rectangular-like multiple-imaging cladding, wherein two straight sides of the rectangular-like shape in this cross-section are replaced with multiple arcs.

Referring to FIG. 14, there shows a schematic illustration of the cross-section of a rectangular-like multiple-imaging cladding. The two straight sides of the rectangular-like shape in this cross-section are replaced with multiple arcs.

In this type cladding, it is preferred that arcs are circular-like, and the centers of the circular arcs are on the opposite side of the cladding as shown in FIG. 14. Thus the center of arc P21–P22 is P12, the center of P11–P12 is P21 and so on. Therefore, P11–P12 is the image of P12–P13, P13–P14, P14–P15, P15–P16, P16–P17, and P17–P18 by multiple reflection.

In summary, the present invention shows some preferred inner cladding geometry of double cladding laser fibers. These symmetry-broken inner claddings minimize or destroy local modes of light beam within the inner cladding and facilitate the light beam to enter the core efficiently.

An article for gain applications can therefore be made comprising a pumping source, a double cladding laser fiber, and coupling optical system, placed between said double cladding fiber and said pumping source, coupling pumping beams from said pumping source into said inner cladding, wherein said inner cladding receives pumping energy and transfer the pumping energy to said core, wherein said double cladding laser fiber comprises a core doped with desired active species, an inner cladding surrounding said core and an outer cladding surrounding the inner cladding, and wherein said inner cladding is a multiple-imaging inner cladding or said inner cladding is an inner cladding that has a symmetry-broken geometry of the present invention that destroys the local modes. The symmetry-broken inner cladding can have asymmetric polygon cross-sectional shapes with only straight boundaries or with arc and straight boundaries, as mentioned earlier. The asymmetric polygon inner claddings have the property that a plurality of said polygons having the same shape can not be tiled on a plane without leaving spaces adjacent polygons. The article for gain applications using the double cladding of the present invention can be a high power fiber laser by further including reflector means as well known in the art. It can also be an optical amplifier by further including means coupling each end of the said double cladding fiber to a respective transmission fiber of upstream and downstream of the amplifier for inputting a signal to be amplified to the amplifier and outputting an amplified signal from the amplifier.

Figure 15:
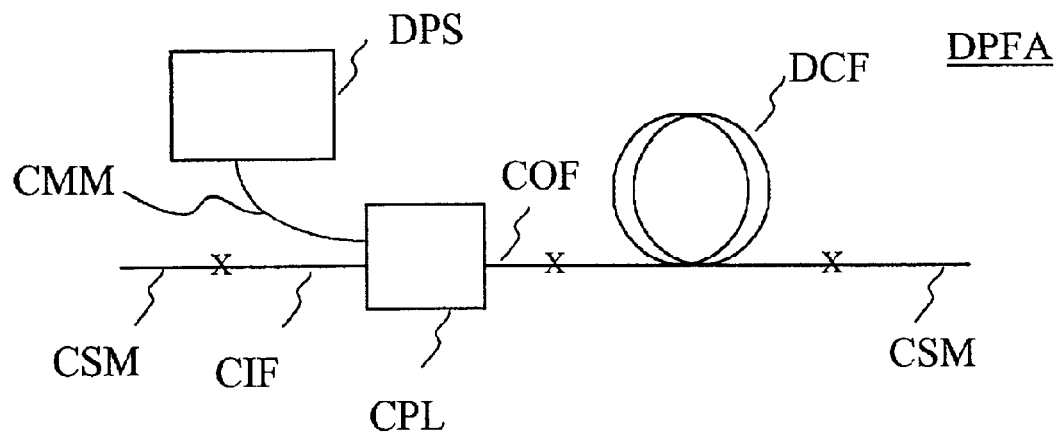
FIG. 15 shows an illustration of an optical amplifier using the double cladding fiber of the present invention.

An embodiment of cladding-pumped fiber amplifier DPFA using the double cladding fibers of the present invention is illustrated in FIG. 15, wherein CSM refers to a conventional single mode transmission fiber. CMM refer to a multimode fiber for pump radiation. Although only one is shown, the number can be greater. CIF refers to single mode fiber that is spliced to the upstream transmission fiber. DPS refer to semiconductor pump lasers having desired wavelength, with the laser output coupled into the multimode fiber. The pumping source is an optical source of known design. CPL refers to a coupler that couples the signal radiation into the coupler output fiber COF, and couples the pump radiation into core and cladding of COF. The coupler can take a variety of forms as well known in the art. Because the core of COF has much smaller cross section than the cladding, most of the pump radiation propagates in the cladding of the fiber. DCF refers to a length of double cladding-pumped fiber, typically fusion spliced to coupler output fiber COF and to downstream transmission fiber CSM. The double cladding-pumped fibers has a single mode core doped with rare earth (e.g., Er and Yb), the core surrounded by an inner cladding having lower refractive index than the core, and the inner cladding surrounded by an outer cladding (such as a polymer coating) of lower refractive index than the inner cladding, such that multimode pump radiation is guided by the fiber, and serves to excite the appropriate rare earth active species in the fiber core. As the optical signal propagates through the core of the double cladding fiber DCF, the optical pumping energy travels through the inner cladding and enters the core by reflection. As defined earlier, the inner cladding of DCF has a cross-sectional shape (perpendicular to the longitudinal direction) of an asymmetric and symmetry-broken polygon that minimizes and destroys the local modes of beams traveling in the inner cladding. It is preferred that the asymmetric cross-sectional shape of the inner cladding has at least four boundaries. When there are four boundaries, the cross-sectional shape of the inner cladding is asymmetric rectangular or rectangular-like (such as the shapes in FIG. 9 and 10). When there are six boundaries, the cross-sectional shape of the inner cladding is an asymmetric hexagon. Besides these asymmetric polygon inner claddings with straight boundaries, one or more arcs can also be introduced as the boundary as shown in FIG. 11a and FIG. 11b, as long as the resulting inner cladding remains asymmetric and keeps the symmetry-broken property that minimizes and destroys local modes of beams reflecting in the inner cladding. Multiple-imaging cladding can also be used as the inner cladding, such as a rectangular-like multiple-imaging cladding disclosed earlier. With this amplifier, the signal radiation is amplified in conventional manner by stimulated emission, with the amplified signal radiation transmitted into the downstream transmission fiber. In FIG. 15, a splice is indicated by an "X" symbol, as is conventional, and some conventional components (e.g., an optional isolator) are not shown.

Figure 16:
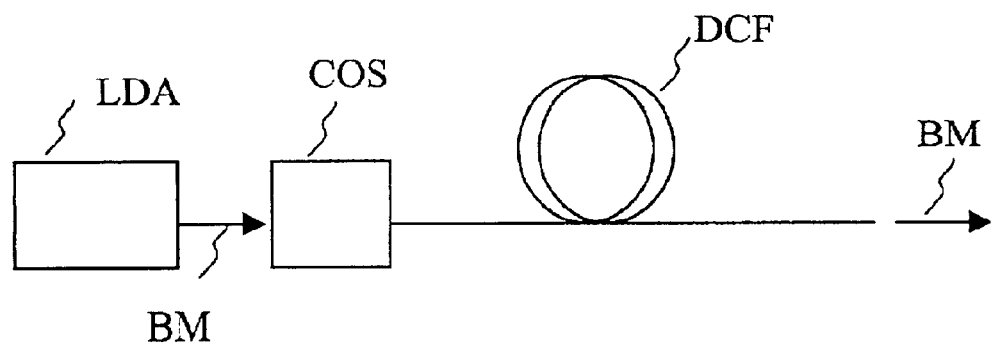
FIG. 16 is a schematic illustration of a fiber laser using the double cladding fiber of the present invention.

FIG. 16 schematically shows an embodiment of high-efficiency fiber laser using the double cladding fibers of the present inventions. Essentially any double cladding fiber laser scheme known to the art can be used by using the double cladding fibers of the present invention to construct a efficient fiber laser. In FIG. 16, BM refers to laser beam. In this embodiment, the fiber laser comprises a diode laser array LDA, a coupling optical system COS, and a double cladding laser fiber DCF with its core doped with active species that are selected based on applications. As well known in the art, reflective coating can be applied on the end of the fiber as reflectors (not shown), or other reflector means such as fiber gratings can be used. The coupling optical system is disposed between the pumping source and the aperture of the double cladding fiber, collecting beams from the pumping laser diode array and coupling the beam into the inner cladding aperture of the laser fiber DCF. As defined earlier, the inner cladding of DCF has a cross-sectional shape (perpendicular to the longitudinal direction) of an asymmetric and symmetry-broken polygon that minimizes and destroys the local modes of beams traveling in the inner cladding. It is preferred that the asymmetric cross-sectional shape of the inner cladding has at least four boundaries. When there are four boundaries, the cross-sectional shape of the inner cladding is asymmetric rectangular or square or rectangular-like (such as the shape in FIG. 9 or 10). When there are six boundaries, the cross-sectional shape of the inner cladding is an asymmetric hexagon. Besides these asymmetric polygon inner claddings with straight boundaries, one or more arcs can also be introduced as the boundary as shown in FIG. 11a and FIG. 11b, as long as the resulting inner cladding remains asymmetric and keeps the symmetry-broken property that minimizes and destroys local modes of beams reflecting in the inner cladding. Multiple-imaging cladding can also be used as the inner cladding, such as a rectangular-like multiple-imaging cladding disclosed earlier.

The coupling optical system COS in this embodiment can include lens, mirror and beam shaping optics. In general, COS does not include optical relay, although optical relay could be useful when multiple laser diode arrays are used in order to achieve very high power. Many established methods well known to the art could be used to focus the beam into the inner cladding of DCF. For high-power fiber lasers, multiple high power laser diode arrays can be used. Some methods used for coupling diode laser beam into a small aperture can be found in U.S. Pat. Nos. 5,268,987, 5,802,092, 5,793,783, 5,790,310, 5,594,752, 5,579,422, 5,568,577, 5,333,077, 5,185,758, 5,139,609, and many other publications.

The foregoing descriptions of embodiments of the invention have been presented for the purpose of illustration and description. It is not intended to limit the invention to the precise form disclosed, and obviously many modification and variation are possible in light of above teaching. The embodiments were chosen and described in order to best explain the principles of the invention and its practical applications to thereby enable others skilled in the art to best utilize the present invention. While specific values have been used and listed in the foregoing embodiments for the sake of easy to understand, they do not set limit on the invention teaching, which is properly described in the claims. The particular values and configurations discussed above can be varied and are cited merely to illustrate particular embodiments of the present invention and are not intended to limit the scope of the present invention.

What is claimed is:

1. The improvement to a process for fabricating an optical fiber having the steps of:

providing a core doped with active species;

providing an inner cladding surrounding the core, the inner cladding having a first polygon profile with equal interior angles with discrete sides adjoining one another at a first set of angles wherein light reflected within the inner cladding has local modes which do not intersect the core doped with active species;

providing an outer cladding surrounding the inner cladding for the confinement of light within the inner cladding;

whereby only the inner cladding transmits light and the outer cladding does not transmit light;

the improvement to the process for fabricating an optical fiber comprising the additional steps of:

altering the first polygon profile with equal interior angles of the inner cladding into a second skewed or distorted polygon profile having a second set of angles, the second skewed or distorted polygon profile of the inner cladding departing from the first polygon profile with equal interior angles with the first set of angles by having small angular changes to at least two of the angles whereby the polygon has a second set of angles with the local modes of the reflection within the inner cladding minimized and destroyed; and, changing at least one boundary of the skewed or distorted polygon to the shape of an arc.

2. The improvement to a process for fabricating an optical fiber according to claim 1 and wherein:

the first polygon profile with equal interior angles is a rectangle.

* * * * *